Dec. 14, 1937.  G. FASSIN ET AL  2,101,933
COLORIMETER
Filed Feb. 25, 1936    2 Sheets-Sheet 2
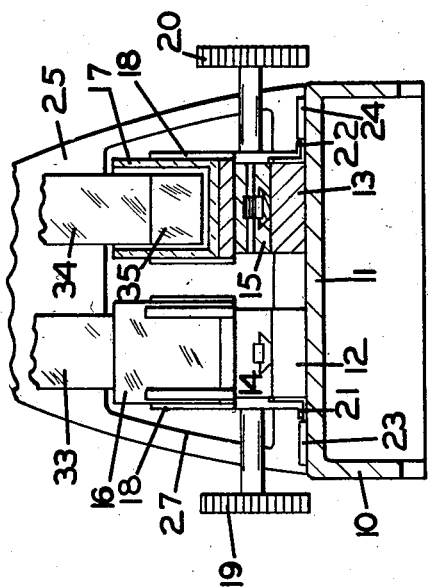
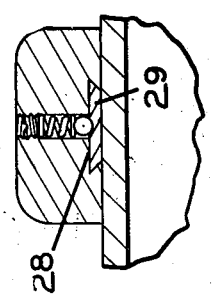
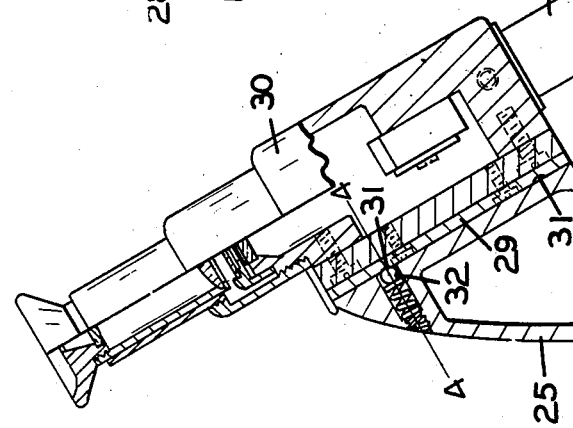
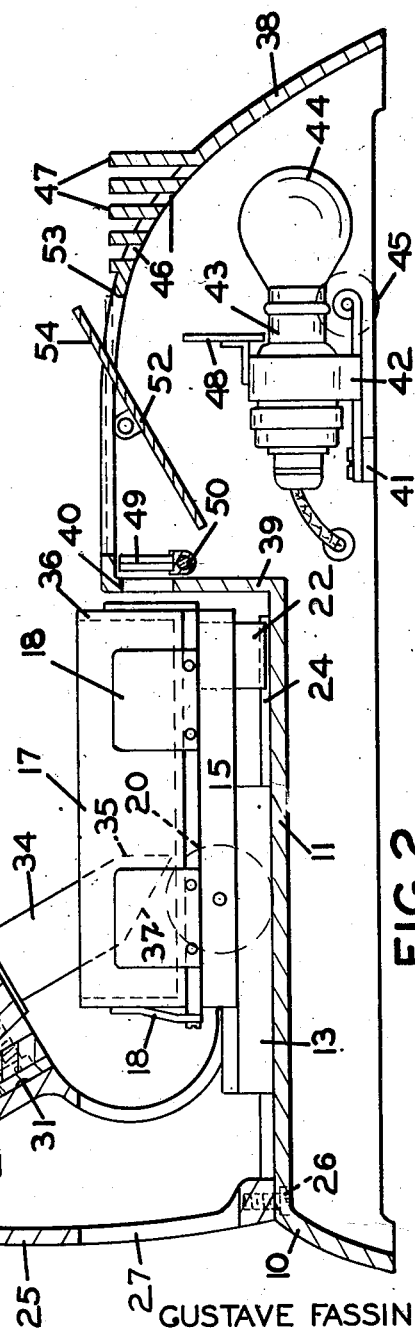
GUSTAVE FASSIN
JOHN R. MILES
INVENTOR
BY
ATTORNEYS Patented Dec. 14, 1937

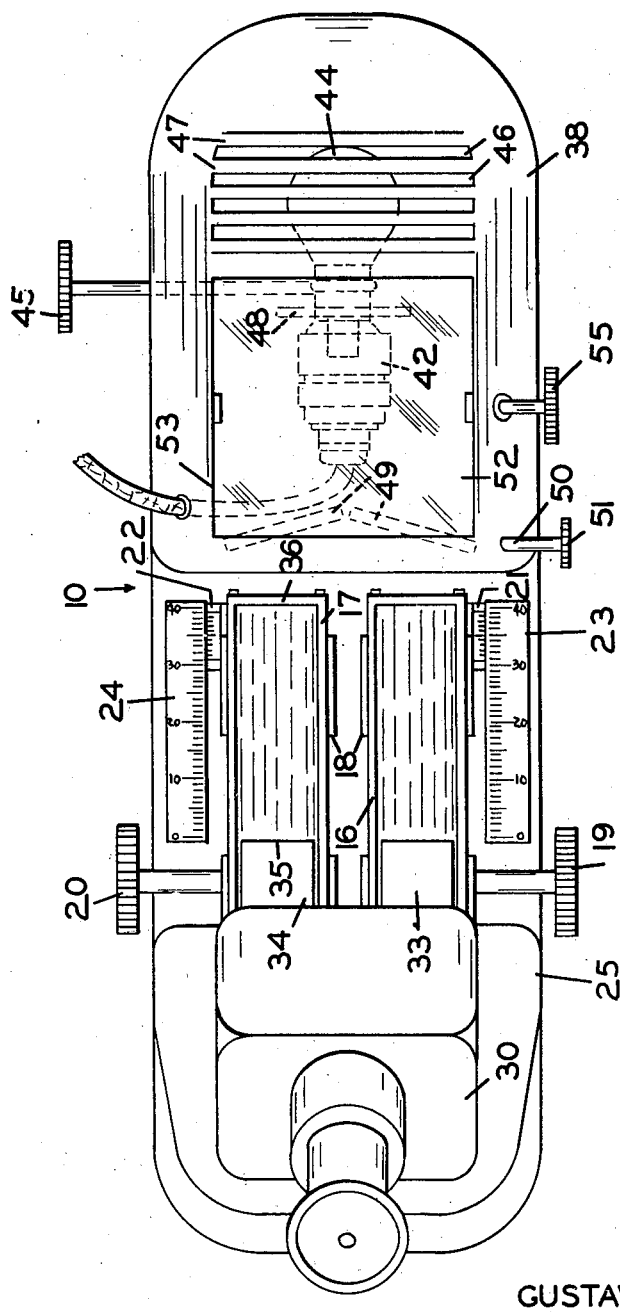

2,101,933

UNITED STATES PATENT OFFICE 2,101,933

COLORIMETER

Gustave Fassin, Irondequoit, and John R. Miles, Rochester, N. Y., assignors to Bausch & Lomb Optical Company, Rochester, N. Y., a corporation of New York Application February 25, 1936, Serial No. 65,650

6 Claims. (Cl. 88—14)

The present invention relates to precision instruments and more particularly to colorimeters.

One of the objects of the present invention is to provide a new and improved colorimeter which is simple and rugged in construction yet efficient and accurate in operation. Another object is to provide a colorimeter in which the specimen containers are horizontally slidable troughs. A further object is to provide a colorimeter having horizontal specimen troughs and an inclined observation system. A further object is to provide a self-contained colorimeter having an improved system of illumination. A further object is to provide a new colorimeter plunger. These and other objects and advantages reside in certain novel features of construction, arrangement and combination of parts as will hereinafter be more fully set forth and pointed out in the appended claims.

Referring to the drawings:

Fig. 1 is a top plan view of a colorimeter embodying this invention.

Fig. 2 is a longitudinal vertical section thereof.

Fig. 3 is a lateral vertical section thereof.

Fig. 4 is a section taken on line 4—4 of Fig. 2.

Fig. 5 is a fragmentary detail view of the plunger.

One embodiment of the present invention is illustrated in the drawings wherein 10 designates a hollow base member having a horizontal portion 11. Two parallel, horizontal guides 12 and 13, mounted upon the horizontal portion 11, carry two slides 14 and 15 upon which the specimen troughs 16 and 17 are secured by clips 18. The slides 14 and 15 are independently adjustable by means of the rack and pinion mechanisms indicated generally at 19 and 20 and carry verniers 21 and 22 cooperating with scales 23 and 24 on the horizontal portion 11 of the base 10 for measuring the amount of fluid under examination.

An upstanding support 25 is fixed at the rear end of the horizontal portion 11 of the base 10 by screws 26 and has an opening 27 which permits the passage of the specimen troughs 16 and 17 therethrough. The upper end of the support 25 has a dovetailed groove 28 in which the dovetailed slide 29 of the observation system 30 is slidable. The dovetailed slide 29 has two depressions 31 which cooperate selectively with a spring pressed ball 32 carried by the support 25 to hold the observation system 30 so that the plungers 33 and 34 are respectively within the troughs 16 and 17 or clear of the troughs.

The optics of the observation system 30 may take any desired form but are preferably of the form shown in Patent 1,806,621 issued May 26, 1931 to J. W. Forrest.

The plungers 33 and 34 and troughs 16 and 17 are identical in form and only one of each will be described in detail. As shown in Figs. 2 and 5, the plunger 34 has a polished, light-receiving, plane face 35 which is parallel to the transparent end 36 of the trough 17 and normal to the direction of movement of the trough on the guide 13. A reflecting surface 37 is formed on the plunger 34 adjacent the plane face 35 so as to reflect the light entering the face 35 along the axis of the plunger 34. This reflecting surface 37 is preferably platinized.

The end of the base 10 removed from the support 25 is enlarged as at 38 to form a lamp housing. A vertical wall 39 forms the end of the housing 38 adjacent the horizontal portion 11 of the base 10 and is provided with a window 40 through which light can pass to the troughs 16 and 17. The interior of the housing is made diffusely reflecting and is made to have a suitably curved surface such as a parabola.

A supporting rod 41 is suitably fixed within the housing 38 and a bracket 42 is pivotally mounted on this rod. The bracket 42 carries the lamp socket 43 and lamp 44 and can be pivoted by means of a control rod 45 so as to change the relative amounts of light passing the two troughs 16 and 17. Thus, referring to Fig. 1, when the lamp 44 is moved toward the left hand wall of the housing 38, more light will be directed to the trough 17 and less to the trough 16. The heat from the lamp 44 is dissipated through the openings 46 and fins 47 on the housing 38.

Direct illumination of the troughs 16 and 17 by the lamp 44 is prevented by an opaque shield 48 on the bracket 42. The light from the lamp 44 which is reflected from the walls of the housing 38 is further diffused by suitable diffusing screens 49 which are mounted on a shaft 50 and may be swung out of the way by the knob 51.

A plate 52 is pivotally mounted in an opening 53 in the housing 38 and is provided with a reflecting surface 54. This plate 52 may be moved by means of the knob 55 so as to occupy either the full or the dotted position shown in Fig. 2. In the full position shown in Fig. 2, the surface 54 of the plate 52 reflects outside illumination through the window 40 to the troughs 16 and 17 and the lamp 44 is not used, while in the dotted position of Fig. 2, the plate 52 closes the opening 53 and serves to prevent the escape of stray light from the lamp 44.

From the foregoing it will be apparent that we are able to attain the objects of our invention and provide a self-illuminated colorimeter having horizontally slidable specimen troughs and an improved observation system. Various modifications can, of course, be made without departing from the spirit of our invention or the scope of the appended claims.

We claim:

1. A colorimeter comprising a base, two specimen troughs horizontally slidably mounted on said base, a support carried by said base, an observation system, two transparent plungers carried by said observation system for immersion in said troughs, said plungers each having a vertical light receiving surface, and means for mounting said observation system on said support above said troughs for sliding movement in an inclined plane whereby said plungers may be selectively immersed or withdrawn from said troughs.

2. A colorimeter comprising a base, two specimen troughs horizontally slidably mounted on said base, a support carried by said base, an observation system having two transparent plungers adapted to extend downwardly into said troughs, means for slidably mounting said observation system on said support for movement along an inclined axis and means for latching said observation system on said support.

3. A colorimeter comprising a base, two specimen troughs horizontally slidably mounted on said base, a support carried by said base, an observation system having two transparent plungers adapted to extend downwardly into said troughs, means for slidably mounting said observation system on said support for movement along an inclined axis from an operative to an inoperative position and latching means carried by said system and said support for holding said system in either said operative or said inoperative position.

4. A colorimeter comprising a hollow, horizontal base, two specimen troughs mounted on said base for movement in parallel horizontal planes, a support carried by said base, an observation system carried by said support, two transparent plungers carried by said observation system extending downwardly into said troughs, a source of light mounted within said base, means for directing light from said source along said troughs toward said plungers and a light receiving surface on said plungers for receiving light from said source.

5. A colorimeter comprising a base, two specimen containers horizontally slidably mounted on said base for movement in spaced, parallel planes, a support carried by said base, an observation system carried by said support at an angle to said base, two transparent plungers carried by said support in alignment with said observation system, said plungers extending downwardly one into each of said containers, a vertical light receiving face on each plunger, means on each plunger for directing light entering said face along said plunger to said observation system, and means for directing light through said containers toward said faces of said plungers.

6. In a colorimeter a horizontal base, a trough having a transparent vertical end horizontally slidably mounted on said base, a transparent plunger carried by said base and extending downwardly into said trough, said plunger having a vertical face parallel to said vertical end of said trough, means for directing the light entering said face of said plunger along said plunger, and means for moving said vertical end of said trough toward or from said face of said plunger.

GUSTAVE FASSIN.
JOHN R. MILES.